(12) United States Patent
Weghorst et al.

(10) Patent No.: US 6,775,559 B1
(45) Date of Patent: Aug. 10, 2004

(54) METHOD AND APPARATUS FOR CONFIGURING THE SETTINGS OF A COMMUNICATION TERMINAL DEVICE FROM A REMOTE LOCATION

(75) Inventors: Ingo Weghorst, München (DE); Peter Guentzer, Groebenzell (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/508,715

(22) PCT Filed: Aug. 14, 1998

(86) PCT No.: PCT/DE98/02358

§ 371 (c)(1),
(2), (4) Date: Mar. 15, 2000

(87) PCT Pub. No.: WO99/14965

PCT Pub. Date: Mar. 25, 1999

(30) Foreign Application Priority Data

Sep. 15, 1997 (DE) .......................................... 197 40 574

(51) Int. Cl.[7] ................................................ H04M 1/00
(52) U.S. Cl. ...................................... 455/558; 455/419
(58) Field of Search ................................ 455/558, 403, 455/410, 411, 412, 414, 418, 420, 419, 556.1, 426, 432.3, 433, 435.1, 435.2, 424

(56) References Cited

U.S. PATENT DOCUMENTS

| 5,276,729 A | | 1/1994 | Higuchi et al. |
| 5,878,036 A | * | 3/1999 | Spartz et al. ............... 370/335 |
| 5,974,322 A | * | 10/1999 | Carlsson et al. ............ 455/446 |
| 6,115,611 A | * | 9/2000 | Kimoto et al. ............ 455/456.3 |
| 6,178,337 B1 | * | 1/2001 | Spartz et al. ............... 455/561 |
| 6,249,681 B1 | * | 6/2001 | Virtanen ..................... 455/466 |
| 6,259,908 B1 | * | 7/2001 | Austin ........................ 455/411 |

FOREIGN PATENT DOCUMENTS

| DE | 195 43 843 A1 | 5/1997 |
| EP | 0 562 890 A1 | 9/1993 |
| WO | WO 97/29606 | 8/1997 |

* cited by examiner

*Primary Examiner*—Congvan Tran
(74) *Attorney, Agent, or Firm*—Bell, Boyd & Lloyd LLC

(57) ABSTRACT

A Method and Device for the Remote Configuration of the Settings of a Communication Terminal Device is provided. The invention relates to a method for configuring the settings at a mobile telephone for providing remote access, for instance, with the aid of a specific service provider. The invention also provides a device for carrying out the method. The configuration settings that are needed at a mobile telephone are not undertaken directly at the device; but rather, an interface is provided so that the setting of the same parameters can also be accomplished in a remote-controlled manner via the radio interface that is present in a mobile telephone.

22 Claims, 2 Drawing Sheets

METHOD AND APPARATUS FOR CONFIGURING THE SETTINGS OF A COMMUNICATION TERMINAL DEVICE FROM A REMOTE LOCATION

BACKGROUND OF THE INVENTION

1. Field of the Invention

The present invention relates to both a method and an apparatus for configuring the settings of a mobile radio telephone per remote access via, for instance, a specific service provider.

2. Description of the Prior Art

The invention relates to a method for configuring the settings of a mobile radiotelephone per remote access, for instance, by means of a specific service provider, and to a device for carrying out the method.

Contemporary mobile radiotelephones have a large number of possible settings with which the user can adapt the device and its functions to the user's needs. These basically fall into three categories:

First, there are the custom settings of the mobile radiotelephone. These include the type and volume of ringing, DTMF dialing, method, various types of blocking, usage settings for short message service (SMS), and calling time display in units or in monetary amounts. The second category includes network settings and settings on the SIM card, such as call diversion and mailbox activation. The third category includes settings at supplementary services of the network; for instance, modifications of the mailbox greeting.

EP 0 562,890 A1. "Mobile Communication Network With Remote Updating of Subscriber Identity Modules in Mobile Terminals," already teaches a method which makes it possible to modify the settings of the SIM card without removing it from the terminal device. The subscriber-specific information that is stored in the SIM card is independent of the device, and the SIM card can be operated in different terminal devices, since the interfaces are standardized.

U.S. Pat. No. 5,276,729 describes a method for controlling a mobile telephone from a remote location. Telephone numbers can be transmitted per DTMF, and a connection set-up that proceeds from tills mobile telephone can be initiated. To prevent misuse of this feature, various security mechanisms are provided.

The publication DE 195 43 843 A1 describes a method for updating, the software in a microcomputer-supported telephone. Via a telecommunication network, complete software modules can be replaced in the telephone by a new version of the module.

WO 97/29606 likewise describes a method which checks whether a specific required program ("Codec", a speech coding, algorithm) is present on the terminal device. If not, the program is transmitted to the terminal device via the mobile radio network in the connection set-up.

The following discussion considers only the first category of mobile radiotelephone settings. A telephone is usually purchased with these settings already preset, and the user only modifies the values which are of interest to such user. Many of these settings are performed at the mobile telephone just once when the telephone is put into operation, or not at all since the user does not wish to use the function or does not see any advantage to it.

The setting of values is usually accomplished with the aid of a display and an input device; i.e., the push button set. Here, the setting process is carried out largely in a menu-driven fashion. Indeed, given a plurality of possible settings, the number of submenus quickly becomes large and thus cluttered.

Thus, many settings only can be performed by the user with the aid of the operating instructions. Due to the constantly growing functionalities of mobile telephones, the menus are becoming ever more complex. Some settings can be understood and performed only if the user is an expert in the area of mobile radio communications.

It is, therefore, an object of the present invention to offer the user of a mobile telephone a simple and convenient capability to set the functions of this device such that it is optimally suited to the user's needs. In addition, it is intended to make it possible to give the user rapid and professional support in the detection and correction of operator errors.

SUMMARY OF THE INVENTION

Such object is achieved by the present invention in a method and apparatus wherein the settings that are required for configuring the mobile telephone need not be performed directly at the device, but rather at an interface which is provided via which the same parameters also can be set in a remote-controlled manner via the radio interface that is present in a mobile telephone. The settings can be performed by service centers and hotlines of the manufacturer or the network operator.

In an embodiment of the present invention, a method is provided for configuring settings of a mobile telephone having a mobile station and a subscriber identification card, wherein the configuration settings are stored in a mobile station, such that the method includes the steps of: sending configuration data that is set in the mobile station to a configuration center via the radio interface of the mobile telephone is a suitable first message; checking the configuration data by the configuration center; modifying the configuration data by the configuration center; receiving, the configuration data by the mobile telephone via the radio interface in a second message; and processing the configuration data at the mobile telephone.

In the embodiment, the method further includes the steps of: interrogating the configuration values that are set in the mobile station; and, upon request of the configuration center, sending the first message via the radio interface of the communication terminal device, wherein the first message contains a configuration data that is set in the mobile station.

In an embodiment of the method, the first message that contains the configuration data also contains an originator by which is can be unambiguously identified.

In an embodiment, the method further includes the step of: setting up the first message that contains the configuration data in accordance with a defined form, wherein it contains a character string identifying it at a defined position.

In an embodiment, the method further includes the step of: enabling remote configuration by the user of the communication terminal device so as to enable the configuration data to be set by remote access.

In an embodiment, the method further includes the step of: protecting by a password the setting of the configuration data by remote configuration.

In an embodiment, the method further includes the steps of: checking the identity of the originator of the remote configuration by an automatic callback of the mobile telephone; and executing the modification of the configuration data only upon reception of an acknowledgment.

In an embodiment of the method, the second message also contains a checksum in addition to the configuration data.

In an embodiment, the method further includes the steps of: generating a message by the communication terminal device subsequent to successive remote configuring; and sending the message to the configuring location in order to check the correct execution of the configuration.

In an embodiment, the method further includes the steps of: performing a diagnosis via the mobile telephone itself; and requesting a remote configuration under certain adjustable conditions via the mobile telephone itself.

In an embodiment of the method, the transmission of the first and second messages containing the configuration data is accomplished via a short message service.

In an embodiment of the method, the transmission of the first and second messages containing the configuration data is accomplished via an unstructured supplementary services data message.

In an embodiment, the method further includes the steps of: securing the second message with the aid of the subscriber identity module; and giving pre-specified commands to initiate actions in the mobile telephone via the SIM card.

In a further embodiment of the present invention, an apparatus is provided for carrying out a remote configuration of settings of a mobile telephone containing a subscriber information card, wherein the apparatus includes: means for storing configuration settings; means for transmitting a first message containing configuration settings; means for receiving a second message containing new configuration setting from a configuration center; means for processing the second message; and means for modifying the configuration data in the mobile telephone.

In an embodiment, the apparatus further includes a key that is stored on the SIM card, via which a configuration message is secured in the SIM card and gives pre-specified commands to initiate actions in the mobile station.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
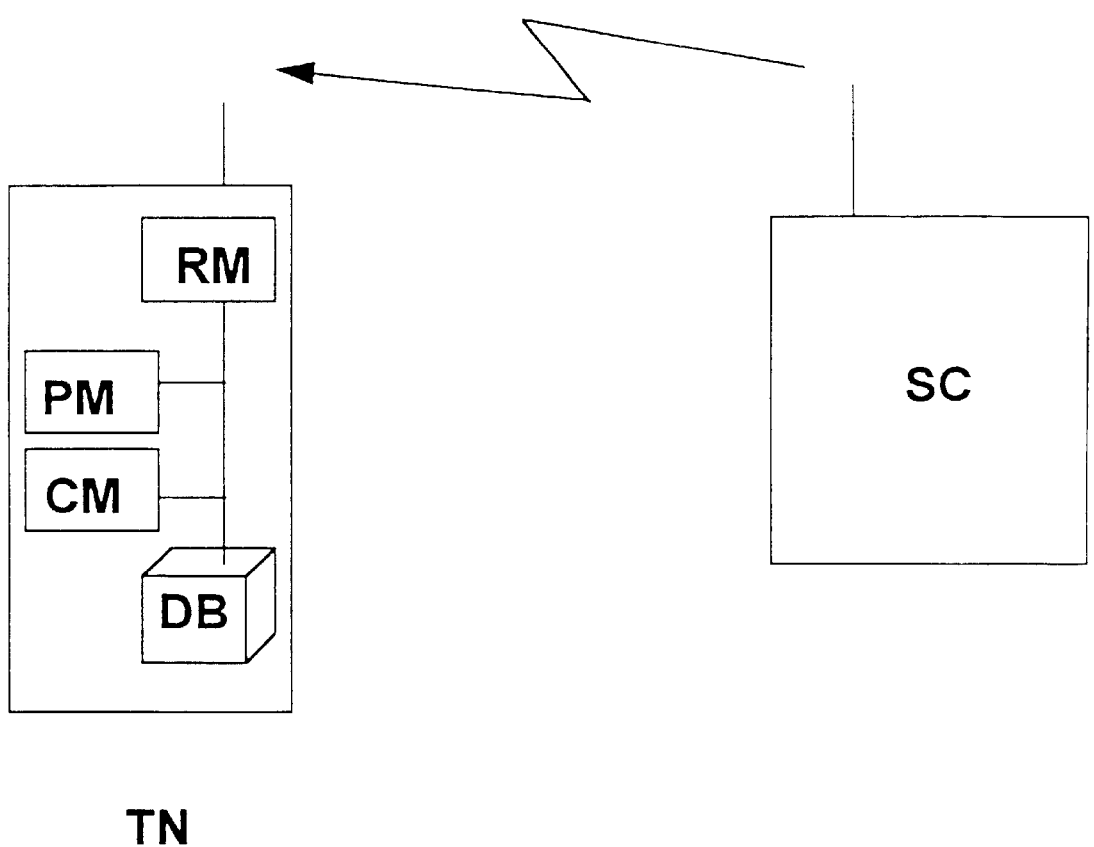
FIG. 1 shows an exemplifying embodiment of the device of the present invention.

FIG. 1 illustrates a terminal device of a subscriber (TN), which can be programmed by the service center via remote configuration. Here, the configuration data being set is stored in the terminal device (DB). The new configuration data is received by means of a receiving part (RM) and is processed in the terminal device (PM). Finally, the configuration data currently being set is modified (CM).

Figure 2:
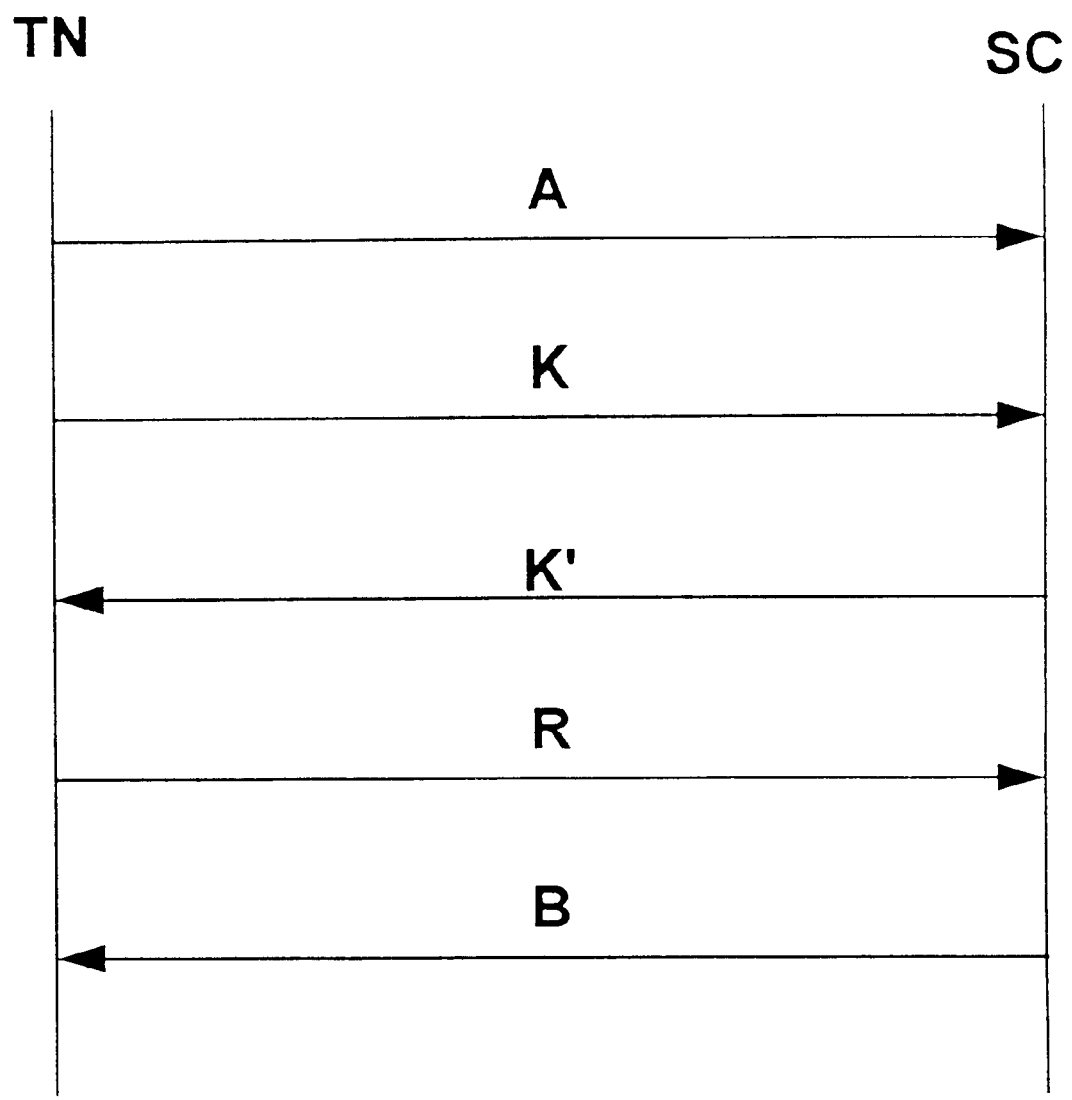
FIG. 2 shows an exemplifying sequence of the present invention of a service call by a subscriber to a service center.

A service call of a subscriber (TN) at a service center (SC) could proceed as in the flowchart illustrated in FIG. 2. The subscriber TN detects a "faulty behavior" of his mobile telephone and asks for help at the service center (call A). So that the service center can make the correct diagnosis, it asks to be sent the configuration data (K) currently being set; for instance, in the SMS format. As soon as the cause is discovered, the service centers transmits the new configuration data (K') to the terminal device of the subscriber.

To prevent misuse of remote configuration, the terminal device of the subscriber TN can initiate a callback R, for example, the result of which is an acknowledgment B of the service center. Only then is the modification of the configuration data of the terminal device carried out.

The radio interface already contained in the mobile telephone is available for receiving configuration messages. A special message format can be defined for the configuration, or known formats such as short message service (SMS) or USSD can be used.

In a further embodiment, which is convenient to the customer and mobile telephone user, it is more expedient for the assistant at the hotline if he or she does not have to laboriously identify the setting of the mobile telephone with the user of the device. Rather, such assistant can call up the status currently being set at the device. This is accomplished by the same radio interface by which the corrected configuration data is subsequently sent to the device. Conversely, the user of the terminal device may be asked, using a specific command, to prompt the user's terminal device to transmit the configuration data currently being set to a permanently set or previously entered service number.

If an SMS or USSD interface is used, the configuration data must be identified as such. This can be done in different ways:

When the device is always serviced by the same service center, this can transmit the user's call number in the configuration message as originator identification. This is then stored on the SIM card or in a permanent place in the telephone book or is checked by the mobile telephone by a callback.

The message can contain an escape sequence at a defined position (e.g., at the beginning), which identifies it as configuration message.

The message contains a check sum (e.g., CRC), so that it is additionally ensured that the configuration data has been transmitted and received correctly.

When the mobile telephone or, respectively, the SIM card supports multinumbering (i.e., when it has a variety of call numbers), one of these call numbers can be reserved exclusively for remote configuration. This likewise guarantees a clean separation of payload data and configuration data.

The undesirable modification of configuration data can be prevented by an explicit enabling of the configuration by the user. To this end, the user is given an instruction on his or her display as soon as the device receives a corresponding message (e.g., "Use received message for remote configuration?", or more descriptively, "The SMS originator with the call number . . . would like to reconfigure the menu ' . . . ' in your device. Allow?"). The remote configuration is performed only if the user acknowledges this message positively.

To prevent unauthorized accessing of the configuration data, a password can be set up, potentially in the form of a PIN number or the IMEI number, which is characteristic of the device but is not generally known. In a further development, filters can be inserted in the mobile telephone already wherein, in certain circumstances, the device automatically sends a diagnostic message to the service center and potentially requests a reconfiguration.

In accordance with the GSM specification, it is possible to secure configuration messages (particularly in SMS format) on the SIM (Subscriber Identity Module) card. With the aid of a command key, the SIM card subsequently can execute predefined commands (already specified in GSM) such as "Start a call".

Although the present invention has been described with reference to specific embodiments, those of skill in the art will recognize that changes may be made thereto without departing from the spirit and scope of the invention as set forth in the hereafter appended claims.

What is claimed is:

1. A method for configuring settings of a mobile telephone having a mobile station and a subscriber identification module, wherein the configuration settings are stored in the mobile station, the method comprising the steps of:

interrogating the configuration values that are set in the mobile telephone;

sending configuration data that is set in the mobile station to a configuration center via the radio interface of the mobile telephone in a first message, said first message containing an originator by which the first message can be unambiguously identified;

checking the configuration data by the configuration center;

modifying the configuration data by the configuration center;

receiving the configuration data by the mobile telephone via the radio interface in a second message; and processing the configuration data at the mobile telephone.

2. A method for configuring settings of a mobile telephone as claims in claim 1, the method further comprising the step of:

enabling, via the user of the communication terminal device, remote configuration only upon which the configuration data then can be set by remote access.

3. A method for configuring settings of a mobile telephone as claimed in claim 2, the method further comprising the step of:

protecting by a password the setting of the configuration data by remote configuration.

4. A method for configuring settings of a mobile telephone as claimed in claim 2, the method further comprising the steps of:

checking the identity of the originator of the remote configuration by an automatic callback of the mobile telephone; and executing the modification of the configuration data only upon reception of an acknowledgment.

5. A method for configuring settings of a mobile telephone as claimed in claim 1, wherein the second message also contains a checksum in addition to the configuration data.

6. A method for configuring setting of a mobile telephone as claimed in claim 1, the method further comprising the steps of:

generating a message, subsequent to successful remote configuring, by the communication terminal device; and sending the message to the configuring location in order to check the correct execution of the configuration.

7. A method for configuring settings of a mobile telephone as claimed in claim 1, the method further comprising the steps of:

performing a diagnosis via the mobile telephone itself; and requesting a remote configuration under certain adjustable conditions via the mobile telephone itself.

8. A method for configuring settings of a mobile telephone as claimed in claim 1, wherein the transmission of the first and second messages containing the configuration data is accomplished via a short message service.

9. A method for configuring settings of a mobile telephone as claimed in claim 1, wherein the transmission of the first and second messages containing the configuration data is accomplished via an unstructured supplementary data message.

10. A method for configuring settings of a mobile telephone as claimed in claim 8, the method further comprising the steps of:

securing the short message service second message with the aid of the subscriber identification module; and giving pre-specified commands, via the subscriber identification module card, to initiate actions in the mobile telephone.

11. An apparatus for carrying out a remote configuration of settings of a mobile telephone containing a subscriber identification module, the apparatus comprising:

means for storing configuration settings;

means for transmitting a first message containing the configuration settings;

means for receiving an interrogation request;

means for receiving a second message containing new configuration settings from a configuration center;

means for processing the second message; and means for modifying the configuration data in the mobile telephone.

12. An apparatus for carrying out a remote configuration of settings of a mobile telephone containing a subscriber identification module as claimed in claim 11, the apparatus further comprising:

a key that is stored on the subscriber identification module, wherein a confirmation message is secured in the subscriber identification module and give pre-specified commands via the key to initiate actions in the mobile station.

13. A method for configuring settings of a mobile telephone having a mobile station and a subscriber identification module, wherein the configuration settings are stored in the mobile station, the method comprising the steps of:

interrogating the configuration values that are set in the mobile telephone;

sending configuration data that is set in the mobile station to a configuration center via the radio interface of the mobile telephone in a first message set up in accordance with a defined form and containing a character string identifying it as a defined position;

checking the configuration data by the configuration center;

modifying the configuration data by the configuration center;

receiving the configuration data by the mobile telephone via the radio interface in a second message; and processing the configuration data at the mobile telephone.

14. A method for configuring settings of a mobile telephone as claims in claim 13, the method further comprising the step of:

enabling, via the user of the communication terminal device, remote configuration only upon which the configuration data then can be set by remote access.

15. A method for configuring settings of a mobile telephone as claimed in claim 14, the method further comprising the step of:

protecting by a password the setting of the configuration data by remote configuration.

16. A method for configuring settings of a mobile telephone as claimed in claim 14, the method further comprising the steps of:

checking the identity of the originator of the remote configuration by an automatic callback of the mobile telephone; and executing the modification of the configuration data only upon reception of an acknowledgment.

17. A method for configuring settings of a mobile telephone as claimed in claim 14, wherein the second message also contains a checksum in addition to the configuration data.

18. A method for configuring setting of a mobile telephone as claimed in claim 14, the method further comprising the steps of:

generating a message, subsequent to successful remote configuring, by the communication terminal device; and sending the message to the configuring location in order to check the correct execution of the configuration.

19. A method for configuring settings of a mobile telephone as claimed in claim 14, the method further comprising the steps of:

performing a diagnosis via the mobile telephone itself; and requesting a remote configuration under certain adjustable conditions via the mobile telephone itself.

20. A method for configuring settings of a mobile telephone as claimed in claim 14, wherein the transmission of the first and second messages containing the configuration data is accomplished via a short message service.

21. A method for configuring settings of a mobile telephone as claimed in claim 14, wherein the transmission of the first and second messages containing the configuration data is accomplished via an unstructured supplementary data message.

22. A method for configuring settings of a mobile telephone as claimed in claim 20, the method further comprising the steps of:

securing the short message service second message with the aid of the subscriber identification module; and giving pre-specified commands, via the subscriber identification module card, to initiate actions in the mobile telephone.

* * * * *